United States Patent
Hickman et al.

(10) Patent No.: US 8,471,849 B1
(45) Date of Patent: Jun. 25, 2013

(54) PRIORITIZATION OF DISPLAY OF PORTIONS OF THREE-DIMENSIONAL OBJECT MODELS

(75) Inventors: Ryan Hickman, Mountain View, CA (US); James J. Kuffner, Jr., Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/559,488

(22) Filed: Jul. 26, 2012

Related U.S. Application Data

(60) Provisional application No. 61/612,461, filed on Mar. 19, 2012.

(51) Int. Cl.
*G06T 17/00* (2006.01)
(52) U.S. Cl.
USPC .......................................... 345/420; 345/428
(58) Field of Classification Search
USPC .................................. 715/700; 345/420, 428
See application file for complete search history.

(56) References Cited

U.S. PATENT DOCUMENTS

2006/0112334 A1* 5/2006 Endrikhovski et al. ....... 715/700

OTHER PUBLICATIONS

Tom Jehaes, Peter Quax, Patrick Monsieurs, Wim Lamotte, "Hybrid representations to improve both streaming and rendering of dynamic networked virtual environments", 2004, VRCAI '04 Proceedings of the 2004 ACM SIGGRAPH international conference on Virtual Reality continuum and its applications in industry, pp. 26-32.*
Autodesk 123D Catch, Catch and carry, Turn ordinary photos into extraordinary 3D models, www.123dapp.com/catch, 2013.

* cited by examiner

*Primary Examiner* — Maurice L McDowell, Jr.
(74) *Attorney, Agent, or Firm* — McDonnell Boehnen Hulbert & Berghoff LLP

(57) ABSTRACT

Methods and systems for prioritization of display of portions of three-dimensional (3D) object data models are described. An example method may include receiving information associated with a plurality of renderings of a 3D model. The received information may identify portions of interest of the 3D model which are inspected while the 3D model is rendered on a display. The method may also include determining frequencies with which the portions of interest are inspected based on the received information, and determining priority values for the portions of interest based on the frequencies with which the portions of interest are inspected. According to the method, a statistical model for the 3D model may be determined via a processor based on the priority values for the portions of interest.

21 Claims, 10 Drawing Sheets

Computer Program Product 1000

Signal Bearing Medium 1001

Program Instructions 1002

- receiving information associated with a plurality of renderings of a three-dimensional (3D) model, wherein the information associated with the plurality of renderings identifies portions of interest of the 3D model which are inspected while the 3D model is rendered on a display;

- determining frequencies with which the portions of interest are inspected based on the received information, wherein a given frequency for a given portion of the 3D model is indicative of a total number of times the given portion is inspected throughout the plurality of renderings;

- determining priority values for the portions of interest based on the frequencies with which the portions of interest are inspected, wherein a priority value of a given portion of interest indicates a priority of the given portion of interest relative to the portions of interest; and

- Determining via a processor a statistical model for the 3D model based on the priority values for the portions of interest.

| Computer Readable Medium 1003 | Computer Recordable Medium 1004 | Communications Medium 1005 |

FIGURE 10

PRIORITIZATION OF DISPLAY OF PORTIONS OF THREE-DIMENSIONAL OBJECT MODELS

CROSS-REFERENCE TO RELATED APPLICATIONS

This application claims the benefit of U.S. Provisional Application No. 61/612,461 filed on Mar. 19, 2012, the entirety of which is herein incorporated by reference.

BACKGROUND

In computer graphics, three-dimensional (3D) modeling involves generation of a representation of a 3D surface of an object. The representation may be referred to as a 3D object data model, and can be rendered or displayed as a two-dimensional image via 3D rendering or displayed as a three-dimensional image. 3D object data models represent a 3D object using a collection of points in 3D space, connected by various geometric entities such as triangles, lines, curved surfaces, etc. Various techniques exist for generating 3D object data models utilizing point clouds and geometric shapes, for examples.

Being a collection of data, 3D models can be created by hand, algorithmically, or based on data from objects that are scanned, for example. As an example, an artist may manually generate a 3D image of an object that can be used as the 3D model. As another example, a given object may be scanned from a number of different angles, and the scanned images can be combined to generate the 3D image of the object. As still another example, an image of an object may be used to generate a point cloud that can be algorithmically processed to generate the 3D image.

3D object data models may include solid models that define a volume of the object, or may include shell or boundary models that represent a surface (e.g. the boundary) of the object. Because an appearance of an object depends largely on an exterior of the object, boundary representations are common in computer graphics.

In some examples, a display of a 3D object data model may be accompanied by an interface for modifying or interacting with a rendering of the 3D object data model. The interface may enable zooming in or zooming out of the 3D model, panning and rotating of the 3D model, or any of a variety of other manipulations of the 3D model.

SUMMARY

In one example aspect, a method is provided that comprises receiving information associated with a plurality of renderings of a three-dimensional (3D) model. The information associated with the plurality of renderings may identify portions of interest of the 3D model which are inspected while the 3D model is rendered on a display. The method may also include determining frequencies with which the portions of interest are inspected based on the received information. A given frequency for a given portion of interest may be indicative of a number of times the given portion is inspected throughout the plurality of renderings. The method may further include determining priority values for the portions of interest based on the frequencies with which the portions of interest are inspected. A priority value of a given portion of interest may indicate a priority of the given portion of interest relative to the portions of interest. According to the method, a statistical model for the 3D model may be determined via a processor based on the priority values for the portions of interest.

In another example aspect, a non-transitory computer-readable memory having stored thereon instructions executable by a computing device to cause the computing device to perform functions is provided. The functions may comprise receiving information associated with a plurality of renderings of a three-dimensional (3D) model. The information associated with the plurality of renderings may identify portions of interest of the 3D model which are inspected while the 3D model is rendered on display. The functions may also include determining frequencies with which the portions of interest are inspected based on the received information. A given frequency for a given portion of interest may be indicative of a number of times the given portion is inspected throughout the plurality of renderings. The functions may further include determining priority values for the portions of interest based on the frequencies with which the portions of interest are inspected. A priority value of a given portion of interest may indicate a priority of the given portion of interest relative to the portions of interest. According to the functions, a statistical model for the 3D model may be determined via a processor based on the priority values for the portions of interest.

In yet another example aspect, a method is provided that comprises receiving data associated with rendering a three-dimensional (3D) model that has a first level of detail and rendering the 3D model having the first level of detail. The method may also include determining information associated with a statistical model for the 3D model. The statistical model may include priority values for portions of interest of the 3D model that are determined based on frequencies with which the portions of interest are inspected while the 3D model is rendered on a display. The method may further include responsively requesting that data associated with rendering the portions of interest having a second level of detail that is higher than the first level of detail be sent in an order that is based on the priority values of the statistical model. The method may additionally include receiving the data associated with rendering the portions of interest having the second level of detail in the order that is based on the priority values of the statistical model. According to the method, the portions of interest may be rendered having the second level of detail.

In still another example aspect, a system is provided that comprises a three-dimensional (3D) model database and a data mining component. The 3D model database may include information indicating multiple levels of detail for portions of a 3D model of an object. The data mining component may be configured to receiving information identifying portions of interest of the 3D model that are inspected while the 3D model is rendered on a display. The data mining component may also be configured to determine a statistical model for the 3D model based on the received information. For example, priority values may be determined for the portions of interest of the 3D model based on frequencies with which the portions of interest are inspected. The data mining component may be further configured to store the statistical model for the 3D model in the 3D model database.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 10 is a schematic illustrating a conceptual partial view of an example computer program product that includes a computer program for executing a computer process on a computing device, arranged according to at least some embodiments presented herein.

DETAILED DESCRIPTION

Figure 1:
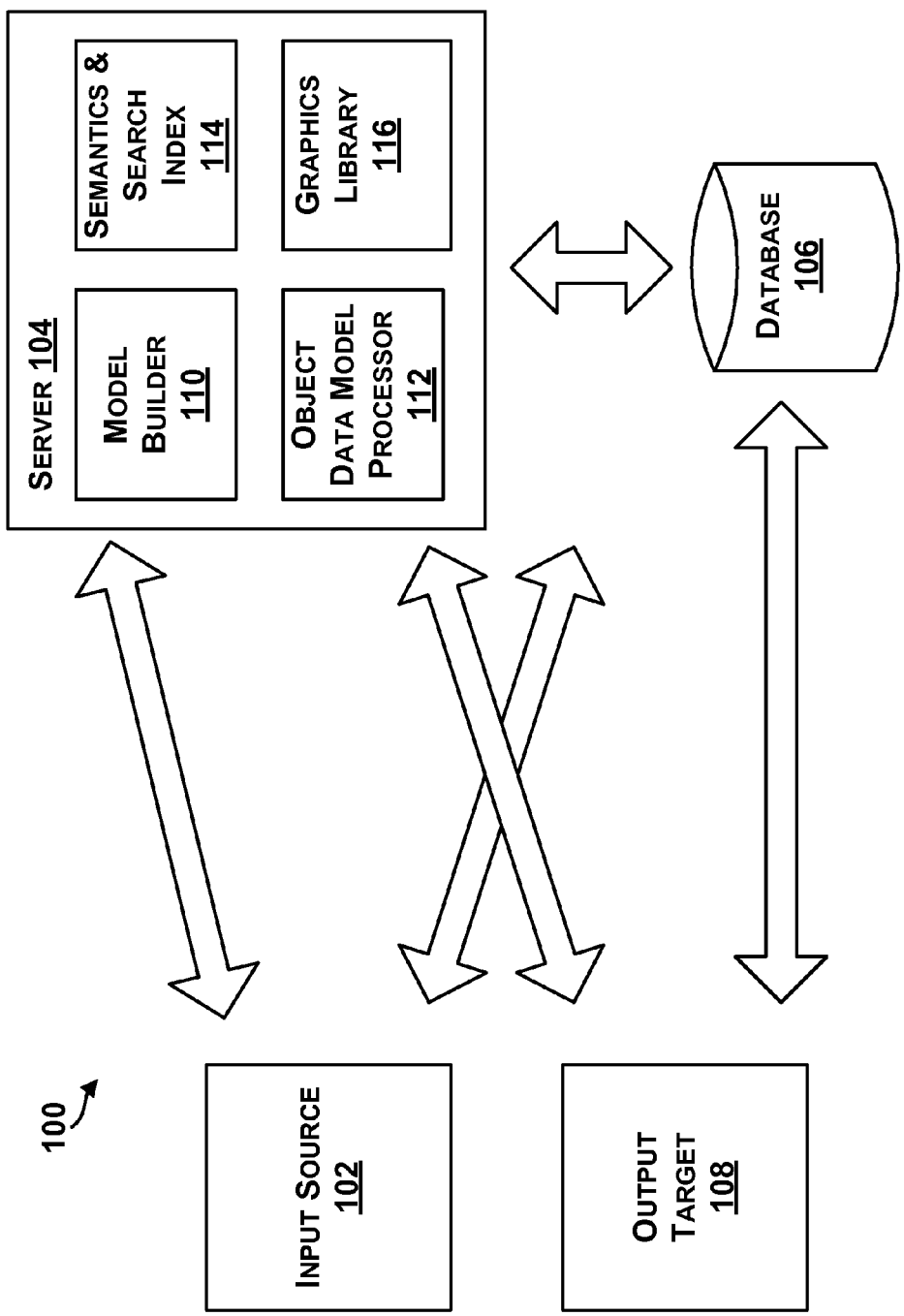
FIG. 1 illustrates an example system for object data modeling.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for prioritization of display of three-dimensional (3D) object data models. In some examples, information associated with renderings of a given 3D object data model, or 3D model, may be logged to determine portions of the given 3D model that should be prioritized. In one instance, a first user may zoom into a first portion of a 3D model to receive high resolution level of detail information. The high resolution level of detail information may include geometry details and/or texture mapping information that are of a higher resolution than an initial level of detail of the rendering of the 3D model. In another instance, gaze-detection data may be analyzed to determine portions of the 3D model that are inspected on a display.

In some examples, based on the logged information, a statistical model, such as an importance map for the 3D model may be determined. The statistical model may prioritize one or more portions of the 3D model based on frequencies with which the portions of the 3D model are inspected while the 3D model is rendered on a display. In one example, the logged information may include information from many users who have separately or jointly viewed a rendering of the 3D model.

In some instances, the statistical model may be used to determine an order to provide high resolution level of detail for portions of the 3D model. In one instance, information at a coarse level of detail can initially be downloaded or streamed relatively quickly for a 3D model such that the 3D model having the coarse level of detail may be rendered on a display with no discernible delay. Subsequently, higher resolution level of detail information may be downloaded or streamed for portions of the 3D model in the order that was determined based on the statistical model. In some instances, this may result in higher resolution level of detail information being sent to a computing device that is rendering the 3D model for portions of the 3D model that a user is most likely to inspect prior to higher resolution level of detail information being sent for other portions of the 3D model that are less likely to be inspected. Thus, information associated with viewings or interactions with renderings of a 3D model may be measured and used to predict which portions of a 3D model users desire high level of detail information for and smartly deliver a high resolution 3D model as quick as possible for the desired portions.

Referring now to the figures, FIG. 1 illustrates an example system 100 for object data modeling. The system 100 includes an input source 102 coupled to a server 104 and a database 106. The server 104 is also shown coupled to the database 106 and an output target 108. The system 100 may include more or fewer components, and each of the input source 102, the server 104, the database 106, and the output target 108 may comprise multiple elements as well, or each of the input source 102, the server 104, the database 106, and the output target 108 may be interconnected as well. Thus, one or more of the described functions of the system 100 may be divided up into additional functional or physical components, or combined into fewer functional or physical components. In some further examples, additional functional and/or physical components may be added to the examples illustrated by FIG. 1.

Components of the system 100 may be coupled to or configured to be capable of communicating via a network (not shown), such as a local area network (LAN), wide area network (WAN), wireless network (Wi-Fi), or Internet, for example. In addition, any of the components of the system 100 may be coupled to each other using wired or wireless communications. For example, communication links between the input source 102 and the server 104 may include wired connections, such as a serial or parallel bus, or wireless links, such as Bluetooth, IEEE 802.11 (IEEE 802.11 may refer to IEEE 802.11-2007, IEEE 802.11n-2009, or any other IEEE 802.11 revision), or other wireless based communication links.

The input source 102 may be any source from which a 3D object data model, or 3D model, may be received. In some examples, 3D model acquisition (shape and appearance) may be achieved by working with venders or manufacturers to scan objects in 3D. For instance, structured light scanners may capture images of an object and a shape of the object may be recovered using monochrome stereo cameras and a pattern projector. In other examples, a high-resolution DSLR camera may be used to capture images for color texture information. In still other examples, a raw computer-aided drafting (CAD) set of drawings may be received for each object. Thus, the input source 102 may provide a 3D object data model, in various forms, to the server 104. As one example, multiple scans of an object may be processed into a merged mesh and assets data model, and provided to the server 104 in that form.

The server 104 includes a model builder 110, an object data model processor 112, a semantics and search index 114, and a graphics library 116. Any of the components of the server 104 may be coupled to each other. In addition, any components of the server 104 may alternatively be a separate component coupled to the server 104. The server 104 may further include a processor and memory including instructions executable by the processor to perform functions of the components of the server 104, for example.

The model builder 110 receives the mesh data set for each object from the input source 102, which may include a data set defining a dense surface mesh geometry, and may generate an animated model of the object in 3D. For example, the model builder 110 may perform coherent texture unwrapping from the mesh surface, and determine textures of surfaces emulated from the geometry.

The object data model processor 112 may also receive the mesh data set for each object from the input source 102 and generate display meshes. For instance, the scanned mesh images may be decimated (e.g., from 5 million to 120,000 surfaces) utilizing texture-preserving decimation. Texture map generation can also be performed to determine color texture for map rendering. Texture map generation may include using the mesh data sets (H) that have colors but no ultraviolet (UV) unwrapping to generate a mesh (D) with UV unwrapping but no colors. As an example, for a single output texture pixel of an image processing may include, for a given point in UV determine a triangle in the mesh's UV mapping (D), and using triangle-local coordinates, move to an associated 3D point on the mesh. A bidirectional ray may be cast along the triangle's normal to intersect with the mesh (H), and color, normal and displacement may be used for an output. To generate an entire texture image, each pixel in the image can be processed.

The semantics and search index 114 may receive captured images or processed images that have been decimated and compressed, and may perform texture resampling and also shape-based indexing. For example, for each object, the semantics and search index 114 may index or label components of the images (e.g., per pixel) as having a certain texture, color, shape, geometry, attribute, etc.

The graphics library 116 may include a WebGL or OpenGL mesh compression to reduce a mesh file size, for example. The graphics library 116 may provide the 3D object data model in a form for display on a browser, for example. In some examples, a 3D object data model viewer may be used to display images of the 3D objects data models. The 3D object data model viewer may be implemented using WebGL within a web browser, or OpenGL, for example.

The database 106 may store all data sets for a 3D object data model in any number of various forms from raw data captured to processed data for display. In addition, the database may store one or more statistical models for the 3D object data model.

The output target 108 may include a number of different targets, such as a webpage on the Internet, a search engine, a database, etc. The output target 108 may include a 3D object data model viewer that enables product advertisements or product searches based on the 3D object data model.

In examples herein, the system 100 may be used to acquire data of an object, process the data to generate a 3D object data model, and render the 3D object data model for display.

Figure 2:
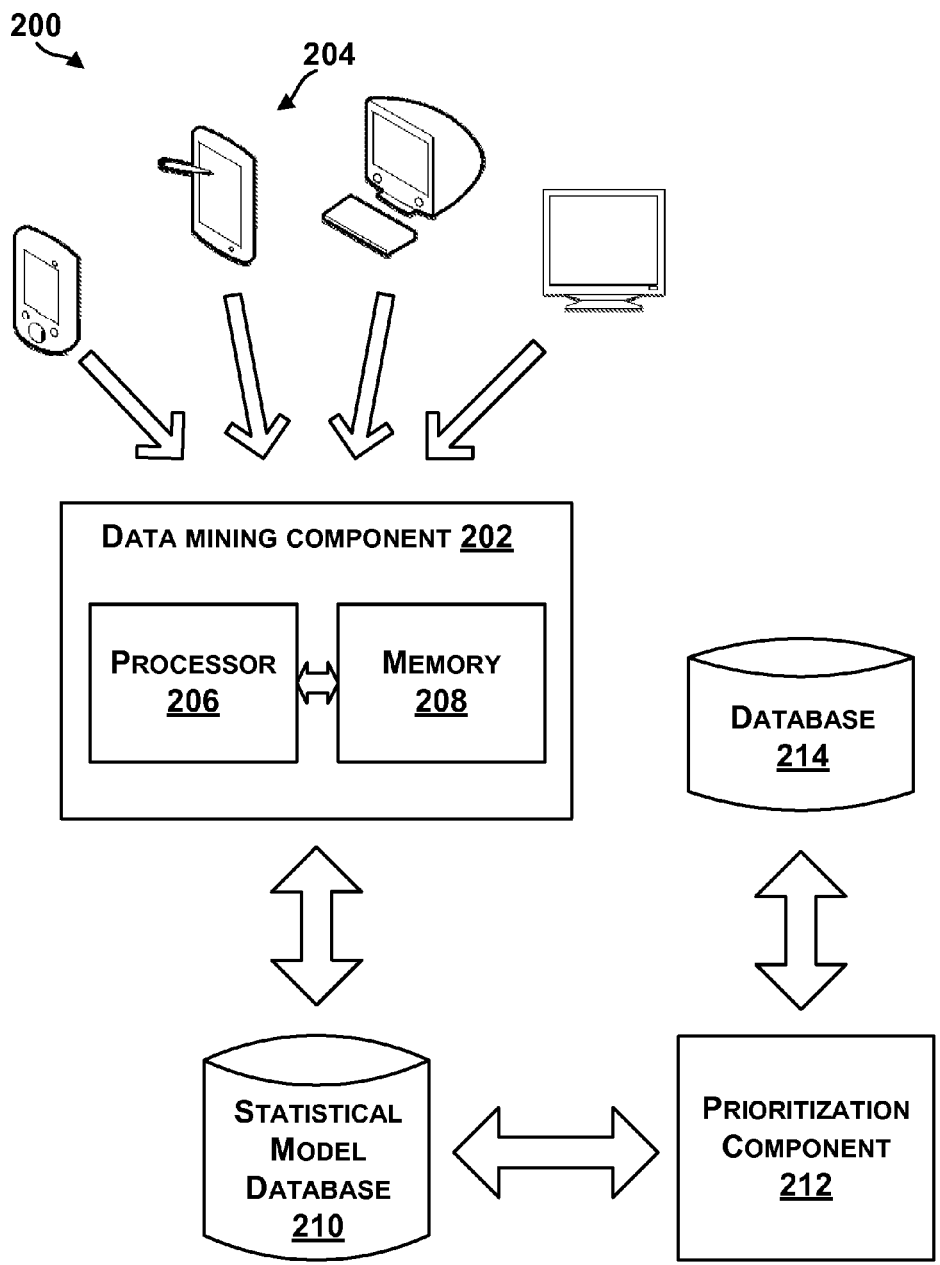
FIG. 2 illustrates an example system for prioritization of display of three-dimensional (3D) object data models.

FIG. 2 illustrates an example system 200 for prioritization of display of three-dimensional (3D) object data models. The system 200 may include a data mining component 202 configured to receive information associated with a plurality of renderings of 3D object data models, or 3D models, on one or more display devices 204.

In some examples, the received information may identify portions of a given 3D model that are inspected, viewed, pointed at, or otherwise identified while the given 3D model is rendered on a display. For example, the one or more display devices 204 may log information such as user input data that is input through a user interface of a given display device. In one instance, the user input data may identify given portions of a 3D model that are zoomed in on. In another instance, the user input data may include gaze-detection data. For example, a camera, such as a front-facing camera coupled to a display device, may identify one or more portions of a 3D model that are gazed at or inspected by a user. In some examples, the one or more display devices 204 may send user input data to the data mining component 204 in real time. In other examples, the one or more display devices 204 may store the user input data, and send the stored data to the data mining component 204 periodically. Additionally, user input data may be sent to the data mining component 202 in response to a request for data from the data mining component 202.

The one or more display devices 204 may be of any type. For example, the one or more display devices 204 may include mobile devices, cellular telephones, tablet computers, laptop computers, desktop computers, wearable computers, etc. The one or more display devices 204 may be configured to render one or more 3D models as described in FIG. 1. In one example, a display device may render one 3D model at a time. In other examples, a display device may render multiple 3D models simultaneously.

The data mining component 202 may include a processor 206 coupled to a memory 208. In one example, the data mining component 202 may determine statistical models for the 3D models based on the information received from the one or more display devices 204. For instance, the data mining component 202 may determine how likely portions of a given 3D model will be inspected during future renderings of the 3D model based on how often portions are gazed at, clicked on, zoomed in to, etc. The data mining component 202 may aggregate the received information from the one or more display devices 204 to determine a statistical model that prioritizes portions of a 3D model based on frequencies with which the portions are gazed at or selected via a user interface. Statistical models for the 3D models may be stored in a statistical model database 210, and updated as additional information is received from the one or more display devices 204 in response to subsequent renderings of 3D models.

The system 200 may also include a prioritization component 212, configured to determine an order in which to send higher resolution level of detail information to an output target on which the 3D model is rendered. The prioritization component may include a processor and a memory. The prioritization component 212 may determine the order based on the statistical model in some instances. For example, the prioritization component may access a database 214 including data associated with rendering the 3D model.

In one instance, the database 214 may include a data set having a first level of detail and a data set having a second level of detail that is higher than the first level of detail for the 3D model. The second data set may be larger in terms of size, and involve more computational effort to render. In response to a request to render the 3D model, the prioritization component 212 may divide the data set into data associated with portions of the 3D object data model that can be progressively streamed or downloaded in the determined order.

Figure 3:
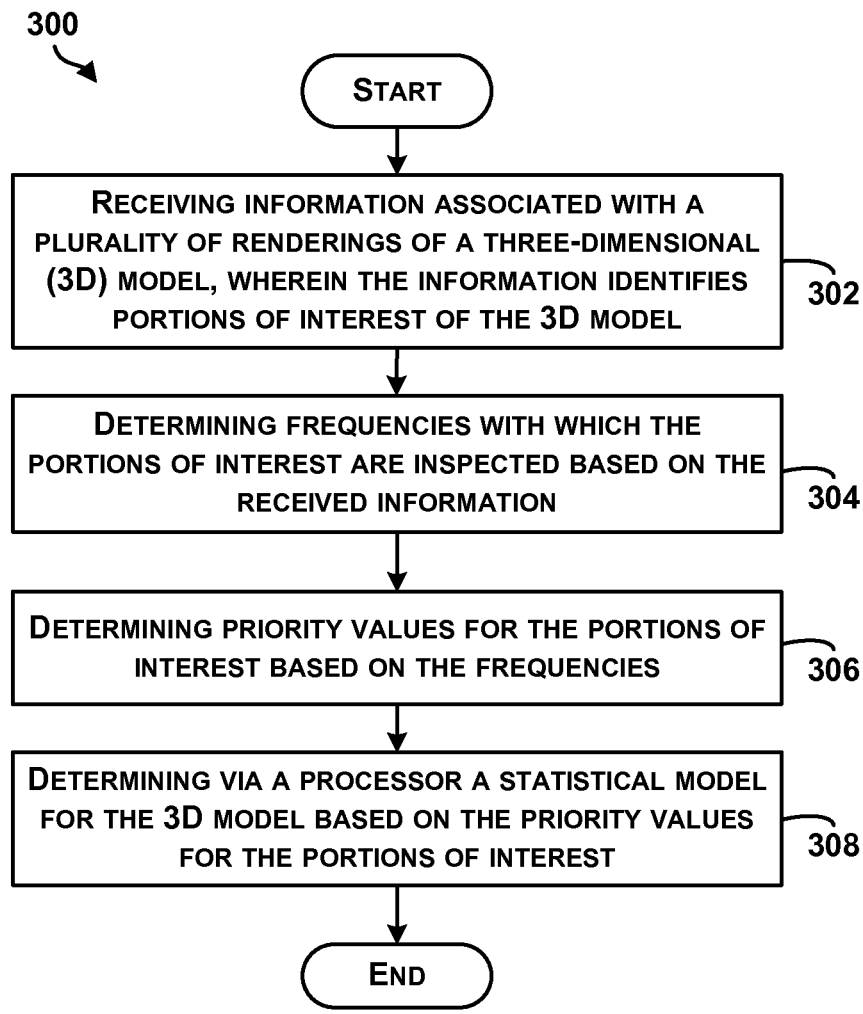
FIG. 3 is a block diagram of an example method for prioritization of a display of a three-dimensional (3D) object data model.

FIG. 3 is a block diagram of an example method for prioritization of a display of a three-dimensional (3D) object data model. Method 300 shown in FIG. 3 presents an embodiment of a method that could be used by the system 200 of FIG. 2, for example. Method 300 may include one or more operations, functions, or actions as illustrated by one or more of blocks 302-308. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 300 and other processes and methods disclosed herein, each block in FIG. 3 may represent circuitry that is wired to perform the specific logical functions in the process.

Initially, at block 302, the method 300 includes receiving information associated with a plurality of renderings of a three-dimensional (3D) model. The information associated with the plurality of renderings may identify portions of interest of the 3D model which are inspected while the 3D model is rendered on a display. For example, a 3D model may be rendered on a display device, and portions of interest may be identified based on information indicating portions of the 3D model that a user looked at, clicked on, zoomed in on, etc.

In one instance, a user may interact with a rendering of a 3D model of a shoe. The user may zoom in on a front portion of the shoe, and may also click on a shoelaces portion of the shoe to see how the shoe would look with different color or style modifications. The display device may log the information, and indicate that the front portion and the shoelace portion were of interest.

In another instance, a camera coupled with a display device may determine gaze-detection data while a user is observing a rendered 3D model of a shoe. Eye-tracking programs may be used to determine a direction or path of the user's gaze. Based on the determined direction or path, portions of the shoe that the user is looking at may be identified based on knowledge of which portions of the shoe rendered on the display intersect with or are near a direction or path of the user's gaze. In a further instance, gaze-detection data may indicate portions of the shoe that are gazed at for a period of time, or fixation time, that is longer than a predetermined threshold, e.g., 2 seconds, and information identifying the portions may be logged.

At block 304, the method 300 includes determining frequencies with which the portions of interest are inspected based on the received information. For example, the received information may be analyzed to determine how often the portions of interest are inspected throughout the plurality of renderings. In one instance, a frequency for a given portion of interest may be indicative of a total number of times the given portion is inspected, viewed, or pointed at throughout the plurality of renderings. In a further instance, various frequencies for the given portion may be determined. For example, a first frequency associated with the total number of times may be determined as well as second frequency associated with a total number of times the given portion is inspected according to gaze-detection data.

At block 306, the method 300 includes determining priority values for the portions of interest based on the frequencies. In one example, the frequencies with which identified portions of a 3D model are inspected may be used to prioritize portions of the 3D model. For instance, a portion of the 3D model that is inspected or otherwise identified while rendered on displays with a highest frequency among frequencies for portions of the 3D model may be assigned a highest priority value. Similarly, a second portion of the 3D model with a second highest frequency relative to other portions of the 3D model may be assigned a second highest priority value, and so forth. In some examples, portions of the 3D model near or surrounding a given portion may also be assigned the priority value of the given portion or influenced by the priority value of the given portion. For example, a priority value of a given portion may be a weighted average of priority values associated with neighboring portions as well as a priority value of the given portion.

At block 308, the method 300 includes determining via a processor a statistical model for the 3D model based on the priority values for the portions of interest. The statistical model may combine all of the priority values and frequencies to determine an importance map for the 3D model. For example, the importance map may be indicative of portions of the 3D model that are likely to be inspected relative to other portions of the 3D model while the 3D model is rendered on a display.

In some examples, the statistical model may be updated periodically. For example, addition information from additional renderings may be incorporated into the priority values of the statistical model. In other examples, the statistical model may be determined based on information received from renderings during a specific time frame. For example, the statistical model may be determined based on received information from a first instance in time to a second instance time, and information associated with renderings that are outside of the time frame may not influence the statistical model.

Figure 4A:
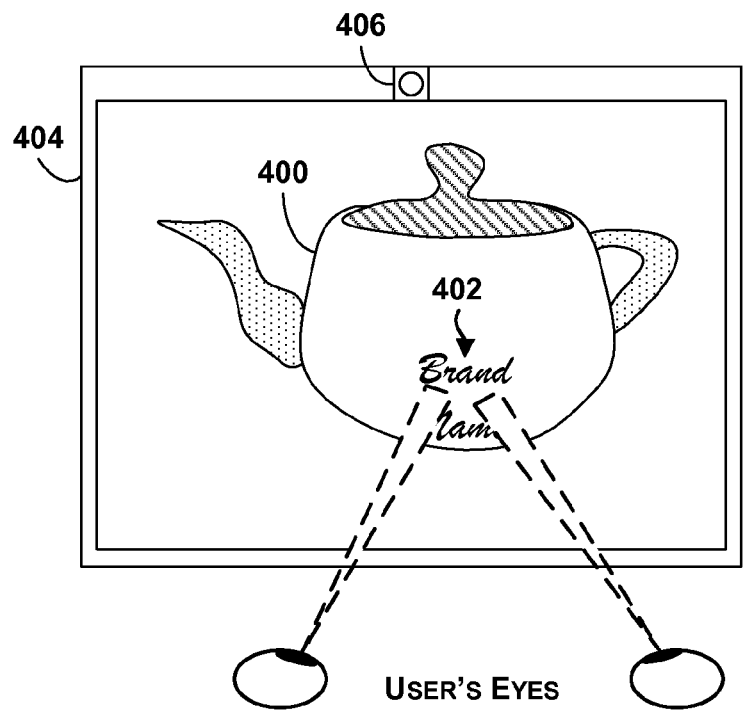
FIGS. 4A-4B are conceptual illustrations of identifications of portions of a three-dimensional (3D) object data model.
Figure 4B:
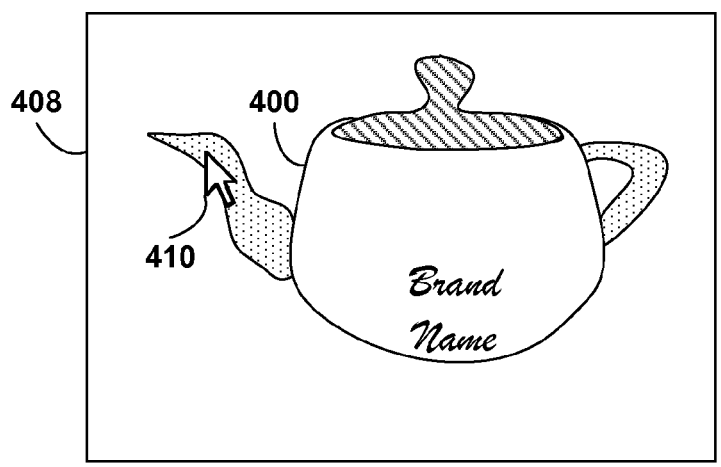

FIGS. 4A-4B are conceptual illustrations of identifications of portions of a three-dimensional (3D) object data model 400. As shown in FIG. 4A, eye-tracking may be used to determine a point of gaze 402 while a user is viewing a rendering of the 3D object data model 400 on a display device 404. The point of gaze 402 may be a point or area of a surface of the display device 404 that intersects a user's gaze.

In one example, a gaze tracking device 406 may be used to measure eye positions and eye movement while the user is viewing the display device 404. For example, a camera or other device may optically measure light reflected from one or more eyes, such as corneal reflections due to infrared or near-infrared light, as well as the center of a pupil to extract eye rotation from changes in the reflections and position of the center of the pupil. In some instances, scanpaths including a series of fixations and saccades may be determined. Because a position of the gaze tracking device 406 may be known relative to the rendering of the 3D object data model 400, portions of the 3D object data model 400 that are viewed may be determined using the scanpaths or portions of the scanpaths. In some instances, the gaze tracking device may be calibrated using a calibration procedure. According to the calibration procedure, a user may look at a point or a series of points while the gaze tracking device 406 measures the gaze direction or changes in gaze direction with respect to an intersection of the gaze with a surface of the display device 404.

In some instances, a heat map for the 3D object data model 400 may be determined based on portions of the 3D object data model 400 where a user or multiple users focused gazes with highest frequency over a period of time. In other examples, other eye tracking techniques and technologies may be used.

As shown in FIG. 4B, user input data may identify portions of the 3D object data model 400. For example, a display device 408 may include a user interface for interacting with a rendering of the 3D object data model 400. A user may point to, select, zoom, pan, rotate, orbit, or otherwise manipulate the 3D object data model 400 via the user interface.

In some examples, user input data may be logged to determine portions of the 3D object data model 400 that a user is interested in. For instance, a position or path of a cursor 410 may be stored. In one example, a user may mouse over a portion of the 3D object data model 400 and scroll a wheel to zoom in on the portion. Information identifying the portion that is zoomed in on as well as portions that are intersected by the path of the cursor 410 may be stored.

Although FIG. 4B is described with respect to a user interface that includes a mouse, information associated with other user interfaces used to interact with a rendering of the 3D object data model may also be stored, and the example is not meant to be limiting.

Information contained in the stored information, such as personal information, need not be collected, and in fact, may actually be removed in order to protect the privacy of users. In some examples, a user may opt-in or opt-out of allowing gaze detection data and/or user input data to be stored and used.

Figure 5:
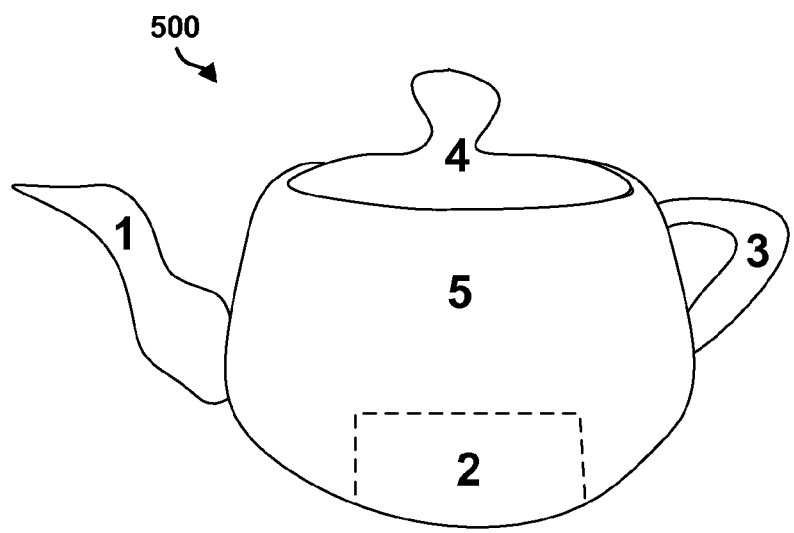
FIG. 5 is a conceptual illustration of a statistical model for a three-dimensional (3D) object data model.

FIG. 5 is a conceptual illustration of a statistical model 500 for a three-dimensional (3D) object data model. The statistical model 500 may include priority values for portions of the 3D object data model. In some instances, the priority values may be determined based on frequencies with which portions of the 3D object data model are inspected or viewed while the 3D object data model is rendered on a display. For example, the 3D object data model may be a 3D model of a teapot. Information associated with the teapot may indicate that the spout of the teapot is inspected with the highest frequency when rendered. Accordingly, in some examples, the spout may be given the highest priority value, "1", as labeled in FIG. 5. Similarly, a portion of the teapot that identifies a manufacturer or brand of the teapot may be the second most frequently observed or inspected portion of the teapot, and the portion may be assigned a priority value of "2". The statistical model 500 may include any number of priority values for any number of portions of the 3D object data model.

In some instances, the statistical model 500 may be used to estimate priority values for similar 3D object data models that represent the same type of object and/or are geometrically similar objects. In the example of the teapot and the statistical model 500, priority values of the statistical model 500 for the teapot may be applied to other styles of teapots for which frequency information may or may not be available. For instance, spouts of other teapots may also be assigned a highest priority value. In other examples, priority values from a 3D model of a shoe may be assigned to similar portions on other 3D models of shoes, or priority values from a statistical model of a car may be assigned to similar portions on other 3D models of cars.

Figure 6:
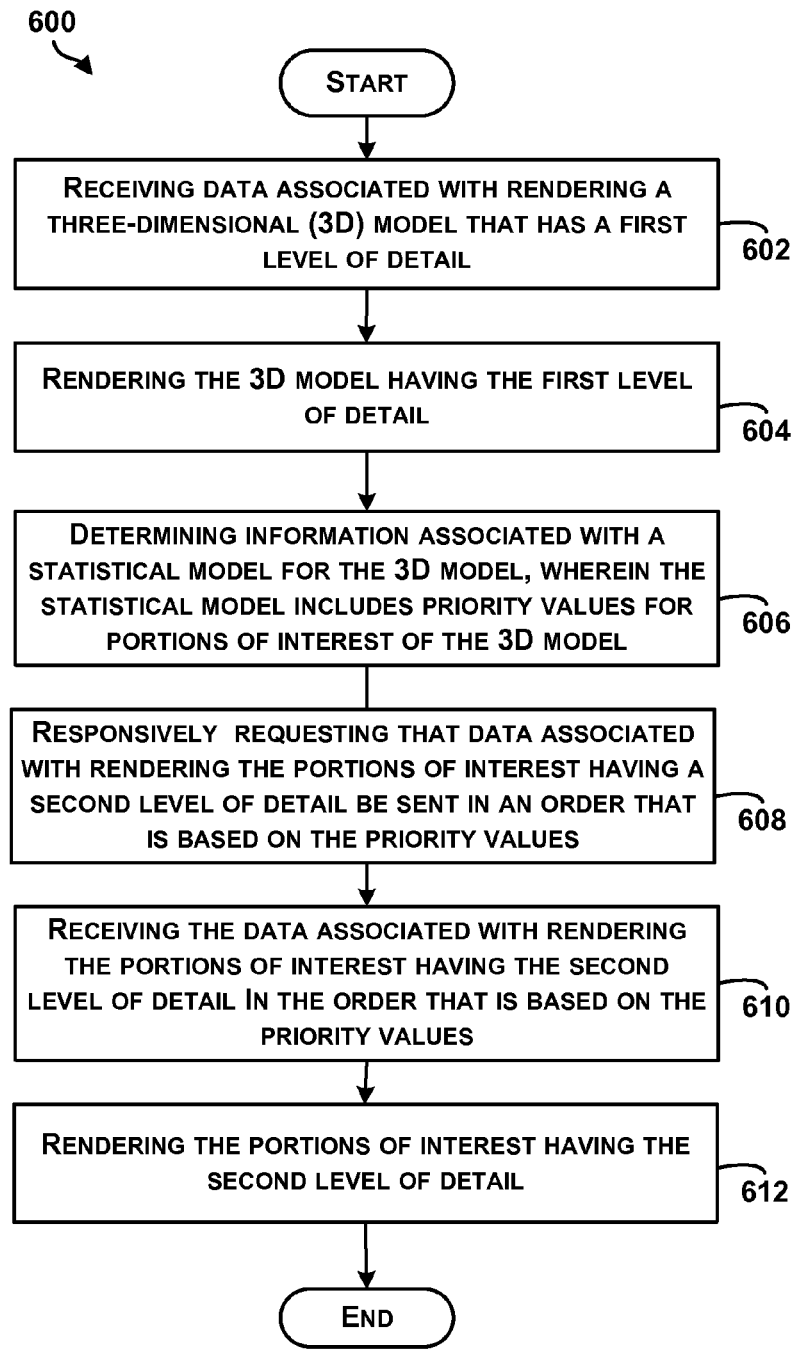
FIG. 6 is a block diagram of an example method for rendering a three-dimensional (3D) object data model based on a statistical model.

FIG. 6 is a block diagram of an example method 600 for rendering a three-dimensional (3D) object data model based on a statistical model. The method 600 shown in FIG. 6 presents an embodiment of a method that may, for example, be used by the system 100 of FIG. 1. Method 600 may include one or more operations, functions, or actions as illustrated by one or more of blocks 602-612. Although the blocks are illustrated in a sequential order, these blocks may also be performed in parallel, and/or in a different order than those described herein. Also, the various blocks may be combined into fewer blocks, divided into additional blocks, and/or removed from the method, based upon the desired implementation of the method. Each block may represent a module, a segment, or a portion of program code, which includes one or more instructions executable by a processor for implementing specific logical functions or steps in the process. In addition, each block in FIG. 6 may represent circuitry that is wired to perform the specific logical functions in the process.

Initially, at block 602, the method 600 includes receiving data associated with rendering a three-dimensional (3D) model that has a first level of detail. For instance, data associated with rendering the 3D model having a coarse level of resolution that is lower than a second level of resolution may be received. At block 604, the method 600 includes rendering the 3D model having the first level of detail. The 3D model may be rendered using the data on a display device. In one example, the device may be a mobile device, and the 3D model may be rendered within a webpage of a web browser.

At block 606, the method 600 includes determining information associated with a statistical model for the 3D model. The statistical model may include priority values for portions of interest of the 3D model that are determined based on frequencies with which the portions of interest are inspected while the 3D model is rendered on a display. In one instance, a processing component associated with rendering the 3D model may access a server to determine the priority values for portions of the 3D model. In another instance, the statistical model may be accessed from a local or remote database. In one example, a device or output target that is rendering the 3D model may request the statistical model from a database of statistical models for 3D models, and information associated with the statistical model, such as the priority values, may be received.

At block 608, the method 600 includes responsively requesting that data associated with rendering the portions of interest having a second level of detail be sent in an order that is based on the priority values of the statistical model. In one example, the second level of detail may be higher than the first level of detail. A request for the statistical model may be sent, and in response to receiving the statistical model, a request may be made that the data associated with rendering the portions of interest having the second level of detail be sent in the order that is based on the priority values.

At block 610, the method 600 includes receiving the data associated with rendering the portions of interest having the second level of detail in the order that is based on the priority values. For example, data that pertains to a portion of interest having the highest priority value may be received first, followed by data that pertains to a portion of interest having the second highest priority value received second. In some examples, data that pertains to rendering portions nearby or adjacent to the portions of interest may be received in parallel with data that pertains to a given portion of interest.

At block 612, the method 600 includes rendering the portions of interest having the second level of detail. In some examples, the data associated with rendering the portions of interest may be rendered as the data associated with rendering the portions of interest having the second level of detail is received. The data associated with rendering the second level of detail may be used to replace or supplement the rendering of the 3D model having the first level of detail as the data is received.

In one example, the graphics library 116 of FIG. 1 may be configured to provide data in a form for display on a display device. A 3D model may include adaptive levels of detail for different portions of the 3D model, including a first level of detail that may be of a coarse resolution, for example. Data associated with rendering the 3D model having the coarse level of resolution may be on the order of one thousand to five thousand polygons, for instance, that may be compressed to around fifty kilobytes. A higher resolution level of detail may be available for portions of the 3D model such as data including on the order of one million polygons in addition to texture mapping and geometric details. The higher resolution level of detail may be multiple megabytes in size, for instance. In some instances, it may be possible to initially stream the data associated with rendering the 3D model having the first level of detail such that the data may be downloaded and rendered without any discernible delay.

Because the higher resolution level of detail is of a larger size, it may be difficult to display a high resolution version of the 3D model for multiple portions of the 3D model without discernible delay. In some examples, the second level of detail may be of a higher resolution than the first level of detail. For instance, the second level of detail may include a finer mesh (i.e., greater number of polygons) as well as texture mapping or geometric information.

In one example, data that pertains to rendering the portions of interest of the 3D model may be sent in an order that is based on the priority values of the statistical model. In some examples, a prioritization component may receive a request for data associated with rendering a 3D model and in response, initially send data associated with rendering the 3D model having the first level of detail. Subsequently, the prioritization component may send the data that pertains to rendering the portions of interest in the order that is based on the priority values because a user is more likely to inspect the portions of interest first. Thus, the priority values may be used to help determine when and where to provide higher resolution level of detail for the 3D model.

Figure 7A:
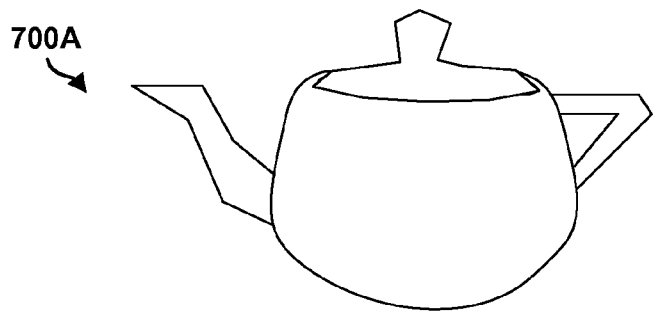
FIGS. 7A-7C are conceptual illustrations of a rendering of a three-dimensional (3D) object data model.
Figure 7B:
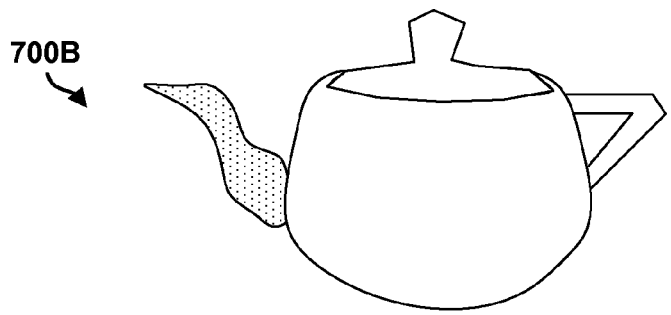
Figure 7C:
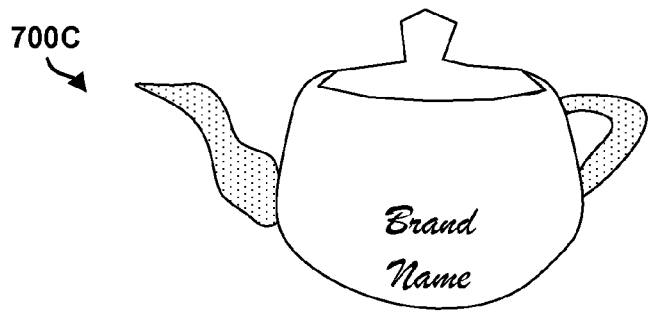

FIGS. 7A-7C are conceptual illustrations of renderings 700A-700C of a three-dimensional (3D) object data model. The renderings 700A-700C of the 3D object data model may result at separate instances in time based on the method 600 of FIG. 6, for example. As shown in FIG. 7A, a first rendering 700A of the 3D object data model 700 may include a rough, low resolution surface mesh of a teapot with minimal geometric information and texture mapping information at a first instance time. As data associated with the rendering the 3D object data model having a second level of detail is received, the rendering 700A of the 3D object data model 700 may be updated.

In one example, the second level of detail may be of a higher resolution a level of detail of the rendering 700A. FIG. 7B illustrates the rendering 700B of the 3D object data model at a second instance time that is subsequent to the first instance in time. As shown in FIG. 7B, the rendering 700B includes higher resolution geometry information and texture mapping information for the spout of the teapot as compared to the level of detail for the spout of the teapot in the rendering 700A. In one example, the spout of the teapot may be a portion of the 3D object data model having a highest priority value, and data associated with rendering the spout may be received prior to data associated with rendering other portions of the teapot using the higher level of detail.

In some examples, after receiving data associated with rendering the spout of the teapot using the higher level of detail, data associated with rendering other portions of the teapot. FIG. 7C shows the rendering 700C of the teapot at a third instance in time that is subsequent to the second instance time. The rendering 700C includes a higher level of texture information illustrating a label on the teapot well as a higher level of detail for geometry and texture information for a handle of the teapot.

Figure 8A:
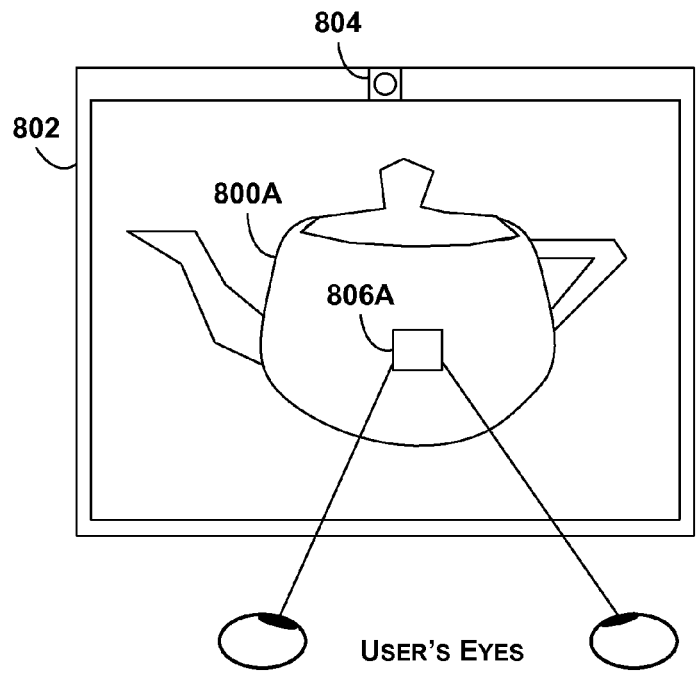
FIGS. 8A-8B are conceptual illustrations of prioritizing a display of a three-dimensional (3D) object data model.
Figure 8B:
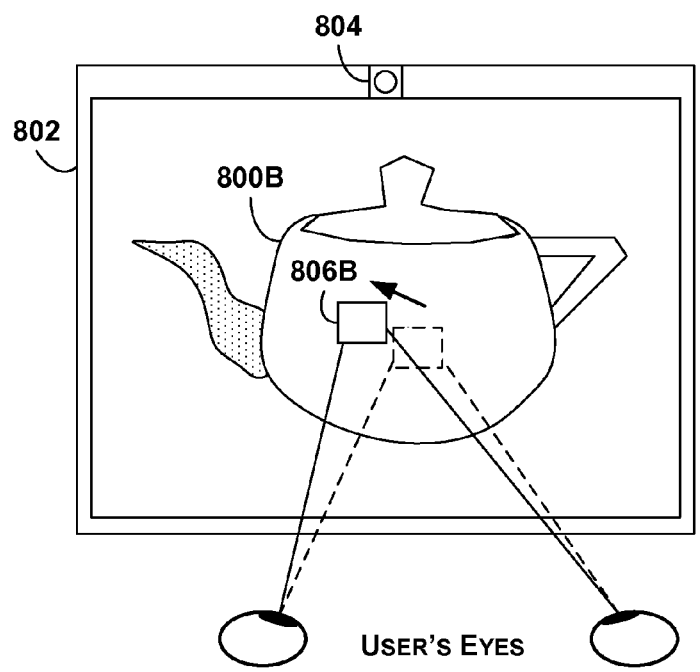

In some instances, gaze detection data may be used in real time to predict a portion of a 3D object data model that a user will look at next, and higher resolution level of detail for that portion may be proactively downloaded and used to render higher resolution level of detail for that portion. FIGS. 8A-8B are conceptual illustrations of prioritizing a display of a three-dimensional (3D) object data model. A display device 802 may include a gaze tracking device 804 coupled to the display device 802. In some example, the gaze tracking device 804 may be used to determine a point or area of a surface of the display device 802 that is intersected by a gaze of a user. As shown in FIG. 8A, a user's eyes may gaze towards a rendering 800A of a teapot on the display device 802. In one example, the rendering 800A may be a coarse resolution rendering of the teapot.

Initially, a point of gaze 806A may be determined, near a middle of the teapot. As shown in FIG. 8B, at a subsequent instance in time, a point of gaze 806B that is different than the point of gaze 800A may be determined. Based on a vector between the point of gaze 806A and the point of gaze 800B, higher resolution level of detail information may be proactively downloaded for a portion of the teapot which intersects with an extension of the vector. In an instance in which the extension of the vector intersects multiple portions of a 3D object data model, priority values for portions of a 3D object data model may be used to determine which portion of the portions intersecting the extension of the vector should be rendered first with a higher resolution. For example, if a first portion having a first priority value and a second portion having a second priority value that is lower than the first priority value each intersect an extension of a vector, higher resolution data for the first portion may be proactively downloaded and used to render the portion in a higher resolution.

Figure 9:
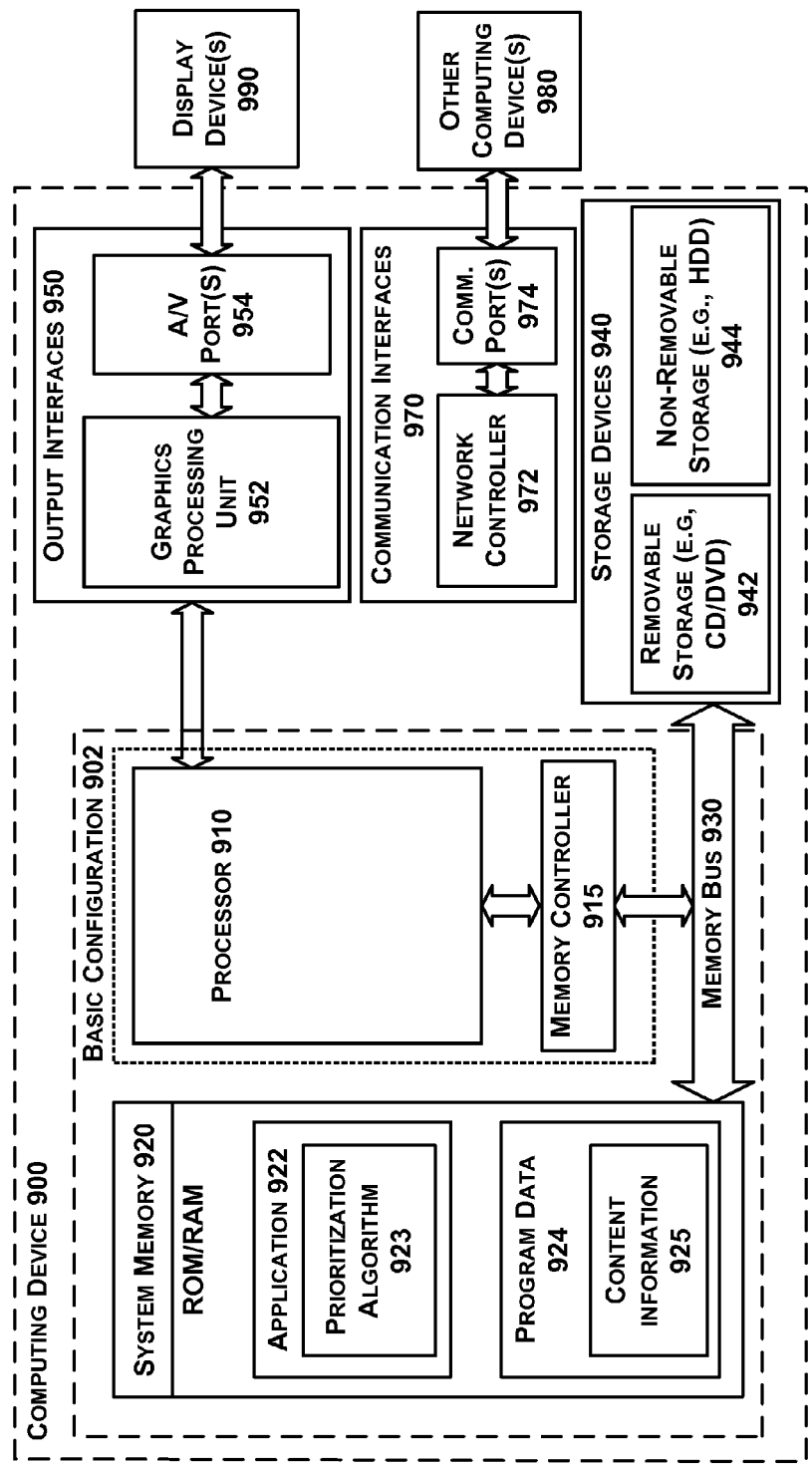
FIG. 9 is a functional block diagram illustrating an example computing device used in a computing system that is arranged in accordance with at least some embodiments described herein.

FIG. 9 is a functional block diagram illustrating an example computing device used in a computing system that is arranged in accordance with at least some embodiments described herein. The computing device may be a personal computer, mobile device, cellular phone, touch-sensitive wristwatch, tablet computer, video game system, or global positioning system, and may be implemented to provide a system for prioritization of display of three-dimensional (3D) data object models as described in FIGS. 1-8. In a basic configuration 902, computing device 900 may typically include one or more processors 910 and system memory 920. A memory bus 930 can be used for communicating between the processor 910 and the system memory 920. Depending on the desired configuration, processor 910 can be of any type including but not limited to a microprocessor ($\mu P$), a microcontroller ($\mu C$), a digital signal processor (DSP), or any combination thereof. A memory controller 915 can also be used with the processor 910, or in some implementations, the memory controller 915 can be an internal part of the processor 910.

Depending on the desired configuration, the system memory 920 can be of any type including but not limited to volatile memory (such as RAM), non-volatile memory (such as ROM, flash memory, etc.) or any combination thereof.

System memory 920 may include one or more applications 922, and program data 924. Application 922 may include a prioritization algorithm 923 that is arranged to provide inputs to the electronic circuits, in accordance with the present disclosure. Program data 924 may include content information 925 that could be directed to any number of types of data. In some example embodiments, application 922 can be arranged to operate with program data 924 on an operating system.

Computing device 900 can have additional features or functionality, and additional interfaces to facilitate communications between the basic configuration 902 and any devices and interfaces. For example, data storage devices 940 can be provided including removable storage devices 942, non-removable storage devices 944, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 920 and storage devices 940 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media can be part of device 900.

Computing device 900 can also include output interfaces 950 that may include a graphics processing unit 952, which can be configured to communicate to various external devices such as display devices 990 or speakers via one or more A/V ports or a communication interface 970. The communication interface 970 may include a network controller 972, which can be arranged to facilitate communications with one or more other computing devices 980 over a network communication via one or more communication ports 974. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 900 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 can also be implemented as a personal computer including both laptop computer and non-laptop computer configurations.

In some embodiments, the disclosed methods may be implemented as computer program instructions encoded on a non-transitory computer-readable storage media in a machine-readable format, or on other non-transitory media or articles of manufacture. FIG. 10 is a schematic illustrating a conceptual partial view of an example computer program product that includes a computer program for executing a computer process on a computing device, arranged according to at least some embodiments presented herein.

In one embodiment, the example computer program product 1000 is provided using a signal bearing medium 1001. The signal bearing medium 1001 may include one or more programming instructions 1002 that, when executed by one or more processors may provide functionality or portions of the functionality described above with respect to FIGS. 1-9. In some examples, the signal bearing medium 1001 may encompass a computer-readable medium 1003, such as, but not limited to, a hard disk drive, a Compact Disc (CD), a Digital Video Disk (DVD), a digital tape, memory, etc. In some implementations, the signal bearing medium 1001 may encompass a computer recordable medium 1004, such as, but not limited to, memory, read/write (R/W) CDs, R/W DVDs, etc. In some implementations, the signal bearing medium 1001 may encompass a communications medium 1005, such as, but not limited to, a digital and/or an analog communication medium (e.g., a fiber optic cable, a waveguide, a wired communications link, a wireless communication link, etc.). Thus, for example, the signal bearing medium 1001 may be conveyed by a wireless form of the communications medium 1005 (e.g., a wireless communications medium conforming with the IEEE 802.11 standard or other transmission protocol).

The one or more programming instructions 1002 may be, for example, computer executable and/or logic implemented instructions. In some examples, a computing device such as the computing device 900 of FIG. 9 may be configured to provide various operations, functions, or actions in response to the programming instructions 1002 conveyed to the computing device 900 by one or more of the computer readable medium 1003, the computer recordable medium 1004, and/or the communications medium 1005.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   receiving information associated with a plurality of renderings of a three-dimensional (3D) model, wherein the information associated with the plurality of renderings identifies portions of interest of the 3D model which are inspected while the 3D model is rendered on a display;
   determining frequencies with which the portions of interest are inspected based on the received information, wherein a given frequency for a given portion of interest is determined based on a number of times the given portion is inspected throughout the plurality of renderings;

determining priority values for the portions of interest based on the frequencies with which the portions of interest are inspected, wherein a priority value of a given portion of interest indicates a priority of the given portion of interest relative to the portions of interest; and determining via a processor a statistical model for the 3D model based on the priority values for the portions of interest.

2. The method of claim 1, wherein the information associated with the plurality of renderings comprises logs of user input data associated with renderings of the 3D model, wherein the user input data identifies the portions of interest.

3. The method of claim 2, wherein the logs of user input data comprise information identifying given portions of the 3D model that are zoomed in on.

4. The method of claim 3, wherein the logs of user input data further comprise information identifying one or more portions of the 3D model that intersect a given motion path of a cursor on the display.

5. The method of claim 2, wherein the logs of user input data comprise gaze-detection data from observations of one or more of the plurality of renderings of the 3D model, wherein the gaze-detection data identifies the portions of interest.

6. The method of claim 5, wherein the gaze-detection data is determined using a front-facing camera coupled to a device on which the 3D model is rendered.

7. The method of claim 1, further comprising:
receiving information associated with another 3D model; and
determining priority values for portions of the another 3D model based on the statistical model, wherein one or more of the priority values for the portions of interest of the 3D model are applied to same or similar portions of the another 3D model.

8. A non-transitory computer-readable memory having stored therein instructions executable by a computing device to cause the computing device to perform functions comprising:
receiving information associated with a plurality of renderings of a three-dimensional (3D) model, wherein the information associated with the plurality of renderings identifies portions of interest of the 3D model which are inspected while the 3D model is rendered on a display;
determining frequencies with which the portions of interest are inspected based on the received information, wherein a given frequency for a given portion of interest is determined based on a total number of times the given portion is inspected throughout the plurality of renderings;
determining priority values for the portions of interest based on the frequencies with which the portions of interest are inspected, wherein a priority value of a given portion of interest indicates a priority of the given portion of interest relative to the portions of interest; and
determining via a processor a statistical model for the 3D model based on the priority values for the portions of interest.

9. The non-transitory computer-readable memory of claim 8, wherein the information associated with the plurality of renderings comprises logs of user input data associated with renderings of the 3D model, wherein the user input data identifies the portions of interest.

10. The non-transitory computer-readable medium of claim 9, wherein the logs of user input data comprise information identifying given portions of the 3D model that are zoomed in on.

11. The non-transitory computer-readable medium of claim 9, wherein the logs of user input data comprise gaze-detection data from observations of one or more of the plurality of renderings of the 3D model, wherein the gaze-detection data identifies the portions of interest.

12. A method comprising:
receiving data associated with rendering a three-dimensional (3D) model that has a first level of detail;
rendering the 3D model having the first level of detail;
determining information associated with a statistical model for the 3D model, wherein the statistical model includes priority values for portions of interest of the 3D model that are determined based on frequencies with which the portions of interest are inspected while the 3D model is rendered on a display;
responsively requesting that data associated with rendering the portions of interest having a second level of detail that is higher than the first level of detail be sent in an order that is based on the priority values of the statistical model;
receiving the data associated with rendering the portions of interest having the second level of detail in the order that is based on the priority values of the statistical model; and
rendering the portions of interest having the second level of detail.

13. The method of claim 12, wherein determining the information associated with the statistical model comprises:
requesting the statistical model for the 3D model from a statistical model database; and
receiving the information associated with the statistical model from the statistical model database.

14. The method of claim 12, further comprising:
determining another portion of interest of the 3D model based on user input data, wherein the user input data is received by an interface associated with a display on which the 3D model is rendered;
requesting data that pertains to rendering the another portion of interest having the second level of detail; and
subsequently receiving the data that pertains to rendering the another portion of interest having the second level of detail.

15. The method of claim 14, wherein the data that pertains to rendering the another portion of interest is received prior to receiving an entirety of the data that pertains to rendering the portions of interest.

16. The method of claim 14, further comprising:
determining gaze-detection data relative to the display on which the 3D model is rendered; and
determining the another portion of interest based on the gaze-detection data and the priority values of the statistical model for the 3D model.

17. A system comprising:
a three-dimensional (3D) model database, wherein the 3D model database comprises information indicating multiple levels of detail for portions of a 3D model of an object; and
a data mining component, the data mining component configured to:
receive information identifying portions of interest of the 3D model that are inspected while the 3D model is rendered on a display;

determine a statistical model for the 3D model based on the received information, wherein priority values are determined for the portions of interest of the 3D model based on frequencies with which the portions of interest are inspected; and store the statistical model for the 3D model in the 3D model database.

18. The system of claim 17, wherein the received information identifying the portions of interest of the 3D model comprises gaze-detection data.

19. The system of claim 17, further comprising:

a prioritization component, the prioritization component configured to:

receive a request for data associated with rendering the 3D model;

send data associated with rendering the 3D model having a first level of detail; and subsequently send data associated with rendering the portions of interest of the 3D model having a second level of detail that is higher than the first level of detail, wherein the data associated with rendering the portions of interest having the second level of detail is sent in an order that is determined by the prioritization component based on the priority values of the statistical model for the 3D model.

20. The system of claim 19, wherein the data associated with rendering the portions of interest of the 3D model having the second level of detail comprises one or more of: geometry information and texture mapping information.

21. The system of claim 17, wherein the data mining component is further configured to:

receive information associated with another 3D model that represents a same type or similar type of object as the object; and determine priority values for portions of the another 3D model based on the statistical model, wherein one or more of the priority values of the portions of interest of the 3D model are applied to same or similar portions of the another 3D model.

* * * * *